United States Patent
Lee et al.

(10) Patent No.: US 9,972,147 B1
(45) Date of Patent: May 15, 2018

(54) SMART BADGE AND AUTHENTICATION SYSTEM USING THE SAME

(71) Applicant: Penta Security Systems Inc., Seoul (KR)

(72) Inventors: Seok Woo Lee, Seoul (KR); Duk Soo Kim, Seoul (KR); Sang Gyoo Sim, Seoul (KR); Kyung Moon Nam, Goyang-si (KR); Yeon Tae Kim, Seoul (KR)

(73) Assignee: Penta Security Systems Inc., Seoul (KR)

( * ) Notice: Subject to any disclaimer, the term of this patent is extended or adjusted under 35 U.S.C. 154(b) by 0 days. days.

(21) Appl. No.: 15/499,918

(22) Filed: Apr. 28, 2017

(30) Foreign Application Priority Data

Feb. 11, 2017 (KR) .......................... 10-2017-0019001

(51) Int. Cl.
*G05B 19/00* (2006.01)
*G07C 9/00* (2006.01)
*H04L 29/06* (2006.01)

(52) U.S. Cl.
CPC ........ *G07C 9/00087* (2013.01); *H04L 63/067* (2013.01); *G07C 2009/00095* (2013.01)

(58) Field of Classification Search
CPC ..... H04L 63/0861; H04L 63/06; G06F 21/32; G06F 21/62; G06F 21/78; G06K 9/00013
See application file for complete search history.

(56) References Cited

U.S. PATENT DOCUMENTS

2007/0186106 A1* 8/2007 Ting .................... H04L 63/0815
713/168

* cited by examiner

*Primary Examiner* — Omeed Alizada
(74) *Attorney, Agent, or Firm* — Revolution IP, PLLC

(57) ABSTRACT

A smart badge of the present invention comprises a communication unit capable of performing wireless communication, an OTP (one-time password) storage unit configured to store therein OTP information for generating one-time password (OTP), a display unit configured to display information, an image storage unit configured to store therein at least two images to be displayed on the display unit, a personal information storage unit configured to store therein user's personal information, an input unit that is to be used for selecting an image to be displayed on the display unit, and a control unit configured to control the respective constitutional elements.

5 Claims, 3 Drawing Sheets

SMART BADGE AND AUTHENTICATION SYSTEM USING THE SAME

CROSS REFERENCE TO RELATED APPLICATION

The present application claims priority from Korean Patent Application Number 10-2017-0019001 filed on Feb. 11, 2017, the entire contents of which are incorporated herein for all purposes by this reference.

BACKGROUND OF THE INVENTION

The present invention relates to a smart badge that can be used as an ID card and an authentication system using the smart badge.

Currently, in each company, ID cards are generally used so as to identify employees.

According to the ID card of the related art, a photograph, a name, an affiliation and the like of the employee are displayed so as to confirm an identity of the employee who uses the ID card.

Each employee uses the ID card so as to confirm the identity, to access a building and the like.

However, according to the ID card of the related art, since a photograph, a name, an affiliation and the like of the employee are displayed, when the employee carrying the ID card goes outside, the personal information displayed on the ID card may be leaked.

Therefore, the employee who uses the ID card of the related art worries about the leakage of the personal information and has displeasure because the personal information is exposed outside.

Also, the ID card of the related art is used only for confirming the identity, accessing a building, and the like. Therefore, the ID card of the related art has very low efficiency and security, from standpoints of efficiency and security

SUMMARY OF THE INVENTION

The present invention has been made in view of the above situations, and an object thereof is to provide a smart badge capable of concealing and exposing user information and being used not only for accessing a company but also for authentication for using in-company apparatuses, and an authentication system using the smart badge.

In order to achieve the object, according to the present invention, a smart badge is provided. The smart badge includes a communication unit capable of performing wireless communication, an OTP (one-time password) storage unit configured to store therein OTP information for generating one-time password (OTP), a display unit configured to display information, an image storage unit configured to store therein at least two images to be displayed on the display unit, a personal information storage unit configured to store therein user's personal information, an input unit that is to be used for selecting an image to be displayed on the display unit, and a control unit configured to control the respective constitutional elements.

In order to achieve the object, according to the present invention, an authentication system is provided. The authentication system includes the smart badge that is to be used by a user, an in-company gate configured to perform wireless communication with the smart badge and to determine whether or not to permit the user to access a company, an in-company apparatus that requests an input of one-time password when a connection request is received and outputs information, which the user wants, when the user is permitted by the input one-time password, and a management server configured to manage the in-company gate and the in-company apparatus.

Effects of the Invention

According to the present invention, it is possible to prevent the personal information from being exposed or leaked outside.

According to the present invention, the user can confirm the identity and access the building by using one smart badge and can obtain authentication for using diverse apparatuses provided in the company.

DETAILED DESCRIPTION OF ILLUSTRATIVE EMBODIMENTS

Hereinafter, illustrative embodiments of the present invention will be described in detail with reference to the accompanying drawings.

Figure 1:
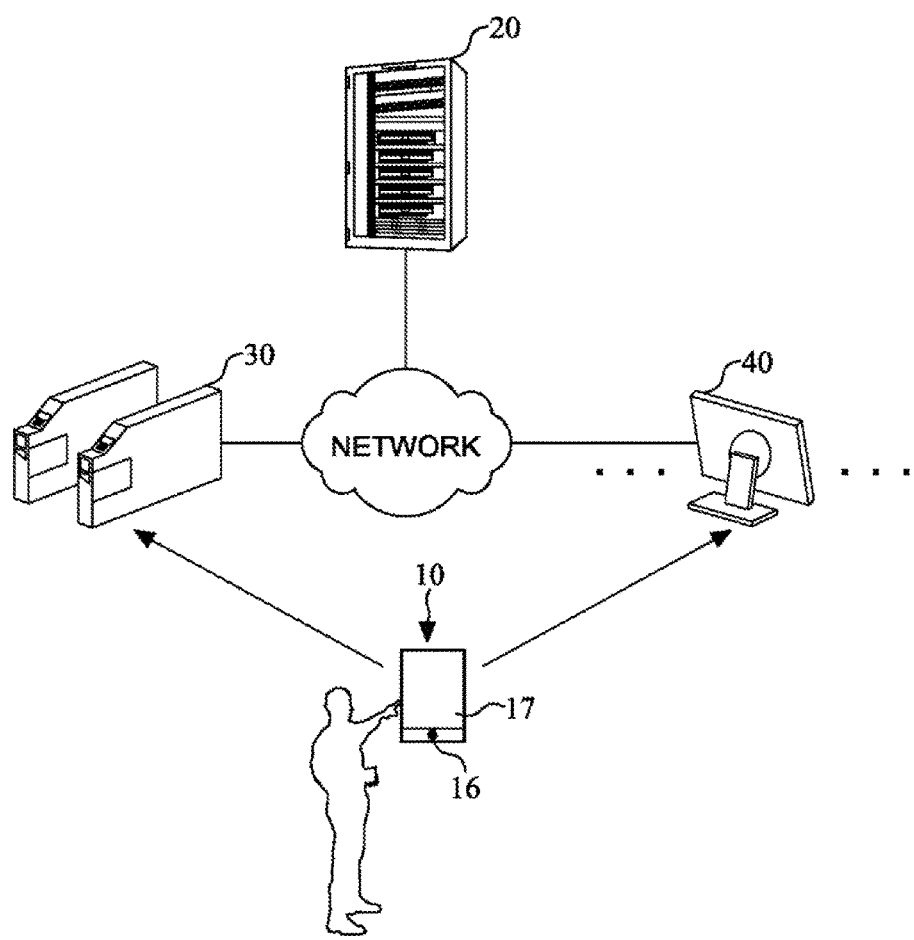
FIG. 1 is a configuration view of an authentication system in accordance with an illustrative embodiment of the present invention.
Figure 2:
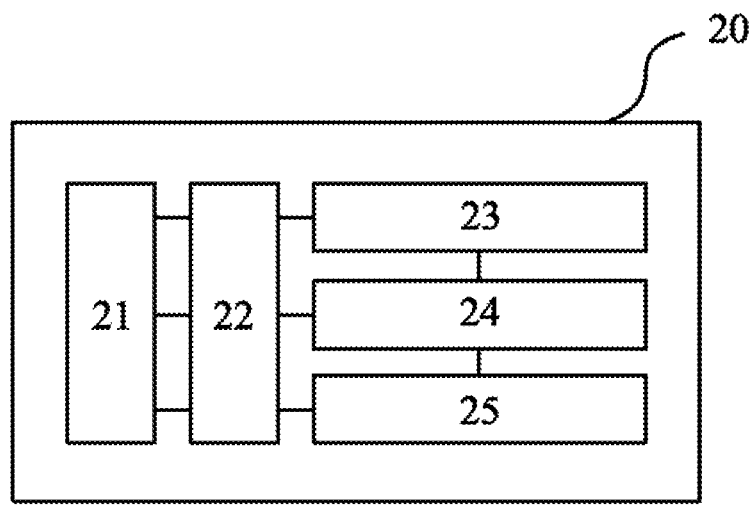
FIG. 2 is a configuration view of a management server that is to be applied to the authentication system of the present invention.

FIG. 1 is a configuration view of an authentication system in accordance with an illustrative embodiment of the present invention, and FIG. 2 is a configuration view of a management server that is to be applied to the authentication system of the present invention.

As shown in FIG. 1, an authentication system in accordance with an illustrative embodiment of the present invention includes a smart badge 10 that is to be used by a user, an in-company gate 30 configured to perform wireless communication with the smart badge and to determine whether or not to permit the user to access a company, an in-company apparatus 40 that requests an input of one-time password (OTP) when a connection request is received and outputs information, which the user wants, when the user is permitted by the input one-time password, and a management server 20 configured to manage the in-company gate 30 and the in-company apparatus 40.

The in-company gate 30 may be a gate configured to an inside and an outside of a building or a gate configured to open and close a specific space in a building.

The in-company gate 30 becomes on or off, depending on personal information that is to be transmitted from the smart badge 10 through wireless communication. Herein, the description "the in-company gate 30 becomes on" means that the user is not permitted to access a building and the description "the in-company gate 30 becomes off" means that the user is permitted to access a building.

In this case, the in-company gate 30 may be configured to directly determine whether or not to permit the access. However, the in-company gate 30 may be configured to transmit the personal information received from the smart badge 10 to the management server 20 and to be on or off depending on whether the management server 20 permits the access.

To this end, the in-company gate 30 is configured to perform communication with the management server 20 through a wired or wireless communication network and to perform communication with the smart badge 10 through a wireless communication network.

The in-company apparatus 40 may be a personal computer, an in-company database server, a printer, a scanner or a variety of apparatuses, for example, and the management server 20 may also be the in-company apparatus 40.

For example, when the in-company apparatus 40 is the in-company database server, a user who wants to use the in-company database server may issue a connection request to the in-company database server. In this case, the in-company database server may request the user to input a password.

The user may request the smart badge 10, which is carried by the user, to generate a password, and input the password output from the smart badge 10 to the in-company database server.

The management server 20 is configured to confirm whether the password input to the in-company database server is a normal password permitted to use the in-company database server. When it is determined that the password allotted to the user is the normal password, the management server 20 approves user authentication. Thereby, the user can use the in-company database server.

The management server 20 is configured to determine whether the personal information or password transmitted from the in-company gate 30 or the in-company apparatus 40 coincides with personal information or password of the user who intends to use the in-company gate 30 or the in-company apparatus 40.

When the user's personal information or the password is matched, the management server 20 transmits approval information to the in-company gate 30 or the in-company apparatus 40. Thereby, the user can pass the in-company gate 30 or use the in-company apparatus 40.

The management server 20 is configured to manage information relating to the one-time password (OTP) that is to be generated from the smart badge 10.

Also, the management server 20 is configured to manage an in-company activity hysteresis of the user by using the information indicating that the smart badge 10 is connected to the in-company gate 30 and the in-company apparatus 40.

For example, the management server 20 can store information indicating when the user has passed the in-company gate 30 or provide the information to a manager. Also, the management server 20 can store information indicating when the user has used the in-company apparatus 40 and what kind of information has been provided from the in-company apparatus 40 or provide the corresponding information to the manager.

To this end, as shown in FIG. 2, the management server 20 includes a communication unit 21 configured to perform communication with the in-company gate 30 and the in-company apparatus 40, a storage unit 23 configured to store therein information relating to personal information and passwords of users for permitting a user to access the in-company gate 30 or the in-company apparatus 40, an input unit 24 configured to receive a variety of information or control signals from a manager, an output unit 25 configure to output a variety of information to the manager, and a control unit 22 configured to control the respective constitutional elements.

The smart badge 10 is configured to transmit the user's personal information to the in-company gate 30 through wireless communication. Thereby, the user can pass the in-company gate 30.

Also, the smart badge 10 can generate and provide one-time password (OTP) to the user.

The specific configuration and functions of the smart badge 10 are described in detail with reference to FIGS. 1 to 3.

Figure 3:
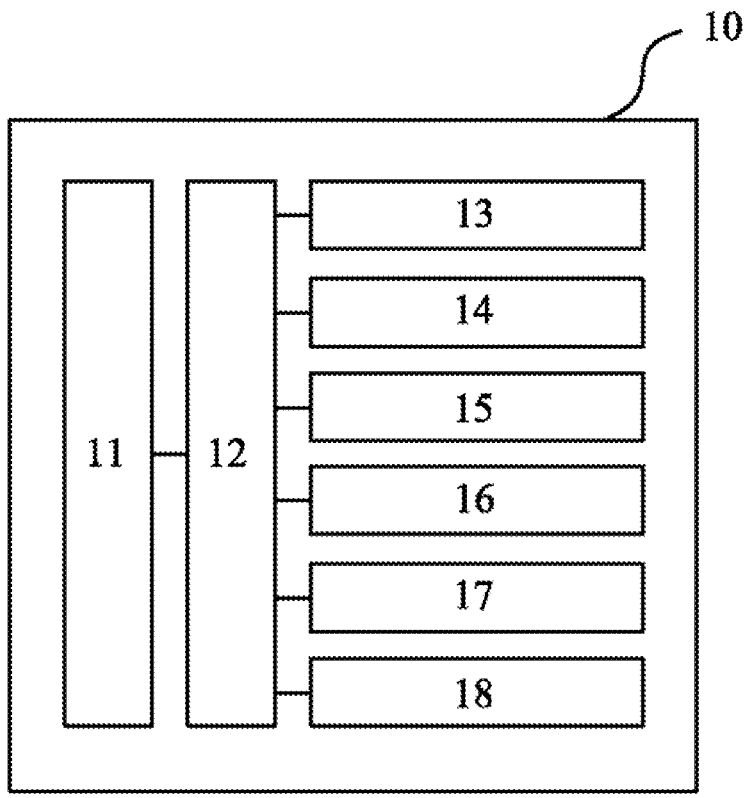
FIG. 3 is a configuration view of a smart badge in accordance with an illustrative embodiment of the present invention.

FIG. 3 is a configuration view of the smart badge in accordance with an illustrative embodiment of the present invention.

As shown in FIG. 3, the smart badge 10 in accordance with an illustrative embodiment of the present invention includes a communication unit 11 configured to perform wireless communication, an OTP (one-time password) storage unit 13 configured to store therein OTP information for generating one-time password (OTP), a display unit 17 configured to display information, an image storage unit 14 configured to store therein at least two images to be displayed on the display unit, a personal information storage unit 15 configured to store therein user's personal information, an input unit 16 that is to be used for selecting an image to be displayed on the display unit, a bio-information authentication unit 18 configured to authenticate bio-information of the user, and a control unit 12 configured to control the respective constitutional elements.

The communication unit 11 can perform communication with the in-company gate 30 or the in-company apparatus 40 through a wireless communication network such as NFC or Bluetooth.

The OTP storage unit 13 is configured to store therein OTP information for generating one-time password (OTP). The one-time password is a password that is to be discarded when it is used once.

In the management server 20, a serial number of the smart badge 10, the personal information of the user who uses the smart badge 10, and information corresponding to the OTP information are stored.

Therefore, the one-time password that is to be generated with the OTP information by the control unit 12 of the smart badge 10 may be generated in the same manner at the management server 20, too. Thereby, the management server 20 can authenticate the user by using the one-time password generated from the smart badge 10.

The display unit 17 is configured to display a variety of information. The display unit 17 may be a liquid crystal display device, an organic light emitting display device or an electrophoretic display device.

The electrophoretic display device uses electrophoresis. The electrophoresis indicates a phenomenon that when a direct current voltage is applied to an electrode dipped in a colloidal ink (hereinafter, simply referred to as 'electronic ink'), colloidal particles move along any one electrode of a positive electrode and a negative electrode, depending on characteristics thereof.

For example, when current is supplied to electrodes provided for pixels of the electrophoretic display device, white particles of colloidal particles provided for the respective pixels move along the negative electrode and black particles move along the positive electrode. By the characteristics, black pixels and white pixels can be expressed. Thereby, an image can be expressed on the electrophoretic display device.

In this case, when particles of diverse colors are further provided for the respective pixels, the electrophoretic display device can express a color image.

In the electrophoretic display device, an image conversion speed is not fast. However, according to the present invention, the image that is to be output through the display unit 17 is not required to continuously change or to rapidly change. Therefore, in the present invention, as the display unit 17, the electrophoretic display device can be used.

In the image storage unit 14, at least two images that are to be displayed on the display unit 17 may be stored.

For example, one of the images may be a personal information image, which indicates information capable of indicating an identity of the user, for example, a photograph, a name, an affiliation and the like of the user.

The other image of the images may be a general image including a simple meaning other than the user's personal information. When it is not necessary to display the personal information image, the user may directly select the general image, which is to be output through the display unit 17, through the input unit 16. The general image may be at least one or more.

The images may include a near field communication image, which is to be output when the smart badge 10 performs wireless communication, an OTP image, which is to be output when the smart badge 10 generates one-time password, and the like.

In the personal information storage unit 15, the user's personal information may be stored. The personal information may include a name, an affiliation and the like of the user.

The user can select any one of the images, which are to be displayed on the display unit 17, through the input unit 16.

For example, when the user enters the company through the in-company gate 30, the user can select the personal information image through the input unit 16. Thereby, the personal information image can be displayed through the display unit 17.

When the user goes outside through the in-company gate 30, the user can select the general image through the input unit 16. Thereby, the general image can be displayed through the display unit 17.

The bio-information authentication unit 18 performs a function of authenticating bio-information of the user.

For example, the bio-information authentication unit 18 may include at least one of a fingerprint input unit configured to receive a fingerprint of the user, a voice input unit configured to receive voice of the user, and an iris input unit configured to receive of an iris image of the user. The bio-information authentication unit 18 is configured to authenticate the user by using the information input through the fingerprint input unit, the voice input unit or the iris input unit.

Only when the user is authenticated through the bio-information authentication unit 18, the control unit 12 can control the constitutional elements and the smart badge 10 can be then normally used.

The control unit 12 performs a function of controlling the constitutional elements.

When a personal information request is received from the in-company gate 30, the control unit 12 can transmit the personal information to the in-company gate 30 through the communication unit 11.

Also, when any one of the images is selected through the input unit 16, the control unit 12 extracts the selected image from the image storage unit 14 and operates the display unit 17 so that the selected image is to be displayed on the display unit 17.

Also, when it is determined through the wireless communication with the in-company gate 30 that the user has entered the company through the in-company gate 30, the control unit 12 can output an image, on which the user's personal information is displayed, of the images, for example, the personal information image through the display unit 17.

Also, when it is determined through the wireless communication with the in-company gate 30 that the user has gone outside through the in-company gate 30, the control unit 12 can output an image, on which the user's personal information is not displayed, of the images, for example, the general image through the display unit 17.

Also, when the user authentication is performed through the bio-information authentication unit 18, the control unit 12 can control the constitutional elements. That is, when the user authentication is not normally performed at the bio-information authentication unit 18, the control unit 12 and the other constitutional elements may not operate.

Also, when a one-time password (OTP) generation request is received through the input unit 16, the control unit 12 can generate one-time password (OTP) by using the OTP information and output the generated one-time password (OTP) through the display unit 17.

Figure 4:
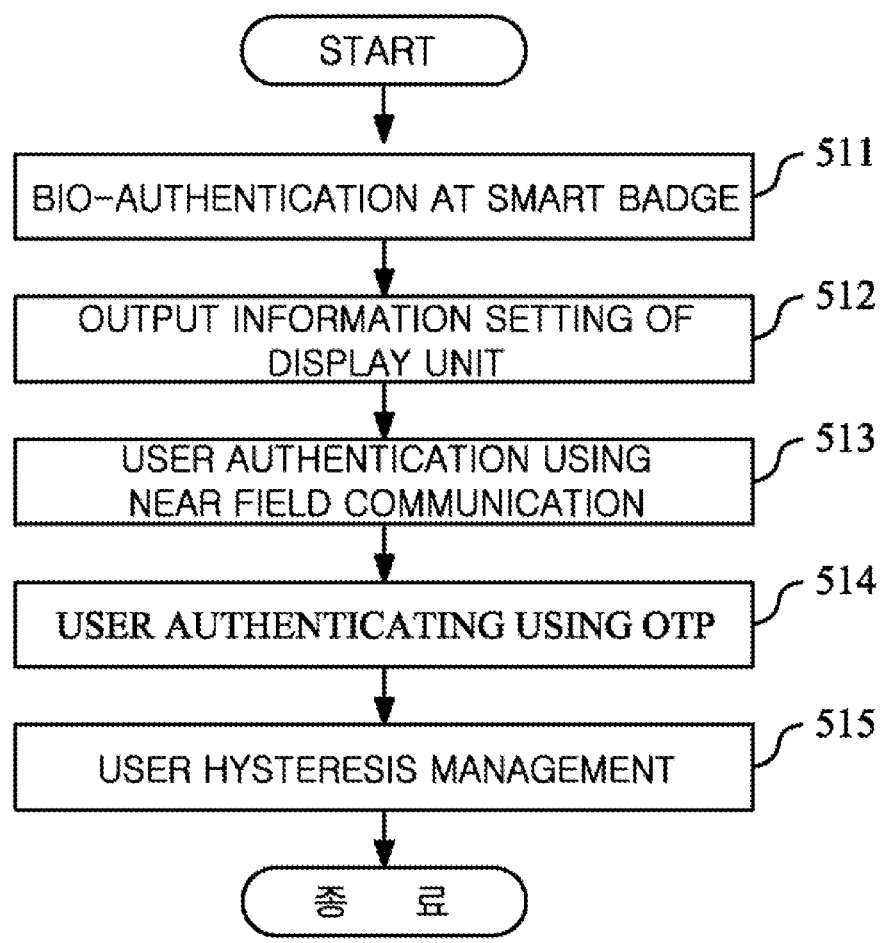
FIG. 4 is a flowchart of a service that is to be provided using the smart badge in accordance with the smart badge of the present invention.

FIG. 4 is a flowchart of a service that is to be provided using the smart badge in accordance with the smart badge of the present invention. In below descriptions, the contents, which are the same as or similar to the above descriptions made with reference to FIGS. 1 to 3, are omitted or simply described.

First, the user who intends to use the smart badge 10 performs authentication through the bio-information authentication unit 18 of the smart badge 10 (511). An authentication period may be diversely changed depending on a user's setting.

For example, the user may input a control signal, which enables the authentication to be performed at preset time every day, through the input unit 16. In this case, when the preset time comes, the control unit 12 may request the authentication. When the authentication is not normally performed, in response to the request, the smart badge 10 may not normally operate.

Also, the user may input a control signal, which enables the authentication to be performed only when a specific service is performed, through the input unit 16. For example, the user may input a control signal, which enables the authentication to be performed when the one-time password (OTP) generation is requested, through the input unit 16.

Then, the user may set an image that is to be output through the display unit 17 (512).

For example, as described above, the user may directly select the personal information image or the general image through the input unit 16.

Also, the user may input a control signal, which enables the personal information image or the general image to be automatically selected and output by the control unit 12, through the input unit 16.

Then, when the user passes the in-company gate 30, the in-company gate 30 requests the smart badge 10 to transmit the user's personal information, through wireless communication (513).

The control unit 12 transmits the personal information stored in the personal information storage unit 15 to the in-company gate 30 through the communication unit 11.

The in-company gate 30 becomes on or off, depending on the personal information transmitted from the smart badge 10 through wireless communication.

In this case, the image that is to be output through the display unit 17 of the smart badge 10 may be automatically changed.

Then, when the user intends to use the in-company apparatus 40, the in-company apparatus 40 requests one-time password (OTP) (514).

The user requests one-time password (OTP) generation through the input unit 16. The control unit 12 generates one-time password (OTP) by using the OTP information stored in the OTP storage unit 13 and outputs one-time password (OTP) through the output unit 17.

The user inputs the one-time password (OTP) output through the output unit 17, through an input unit of the in-company apparatus 40.

The in-company apparatus 40 or the management server 20 determines whether the one-time password (OTP) is a normal one-time password (OTP) for using the in-company apparatus 40.

When it is determined that the one-time password (OTP) is a normal one-time password (OTP), the in-company apparatus 40 can permit the user to use the in-company apparatus 40. Thereby, the user can use the in-company apparatus 40.

The management server 20 can store and manage time information indicating that the user has passed the in-company gate 30. Also, the management server 20 can store and manage time information indicating that the user has used the in-company apparatus 40, information indicating that the user has performed search through the in-company apparatus 40, and the like.

In the below, the present invention is briefly summarized.

The present invention provides the smart badge for protecting the personal information and the authentication system using the smart badge.

The smart badge 10 has the display unit 17. The display unit 17 may consist of a variety of display devices. For example, an inexpensive electrophoretic display device may be used when the rapid operation is not required.

The present invention provides an image conversion function based on the electronic ink, so as to protect the user's personal information that is to be displayed on an in-company identification used in each company. Thereby, it is possible to protect the user's personal information, which may be leaked in the in-company identification of the related art.

The smart badge of the present invention can provide a variety of user authentication functions that are used in IT environments. Therefore, when it is necessary to verify the identity of the user in company, the user can perform authentication with the smart badge 10.

Thereby, the smart badge can perform an authentication device function enabling the diverse apparatuses in company to be used, in addition to an access function. Therefore, the user can use the diverse apparatuses in company, more conveniently.

A method of authenticating the user through the smart badge 10 is described.

For example, the user authentication may be performed through one-time password (OTP) generated from the smart badge 10.

Also, the user authentication may be performed using an electronic signature technology applied to the smart badge 10.

Also, the user authentication may be performed using the wireless communication technology of the smart badge 10.

Also, the user authentication may be performed with the smart badge 10 itself, through the bio-information authentication unit 18 provided in the smart badge 10.

The authentication system of the present invention can manage an in-company position and diverse hysteresis of the user by collecting and managing the information, which indicates that the user has accessed the in-company gate 30 with the smart badge 10, the information indicating that the user has connected to the in-company apparatus 40 with the smart badge 10, and the like.

Making an additional remark, the in-company identification of the related art always exposes the personal information such as a personal photograph, an affiliation, a name and the like. However, the smart badge 10 of the present invention using the electronic ink provides a function by which a screen can be switched in accordance with a user's intention and a place, so that the personal information can be protected. Therefore, the smart badge of the present invention can provide the higher security than the in-company identification of the related art.

According to the present invention, the user can access a variety of in-company infrastructures (physical systems, IT systems and the like) with the smart badge 10. Therefore, it is possible to conveniently manage the diverse infrastructures and the user can conveniently use the infrastructures.

Since the user authentication (fingerprint authentication) can be performed at the smart badge 10 itself, the smart badge 10 cannot be used by a third person even if the smart badge is lost. Therefore, the security is improved.

The smart badge 10 can generate one-time password by using a time synchronization method, and the user can access a variety of service devices by using the one-time password. Therefore, the user is not required to carry a separate OTP generator and the security can be improved.

The authentication system of the present invention can conveniently manage the hysteresis of the employees and visitors by using one medium, i.e., the smart badge 10.

One skilled in the art of the present invention can understand that the present invention can be implemented in other specific forms without changing the technical spirit and essential features. Therefore, it should be understood that the above illustrative embodiments are just exemplary. The scope of the present invention is defined in the claims, not the above descriptions, and all changes and modifications that are to be deduced from the meaning and scope of the claims and equivalent concepts thereof should be construed to be included in the scope of the present invention.

The invention claimed is:

1. An authentication system comprising:
a smart badge that is to be used by a user;
an in-company gate configured to perform wireless communication with the smart badge and to determine whether or not to permit the user to access a company;
an in-company apparatus that requests an input of one-time password when a connection request is received and outputs information, which the user wants, when the user is authenticated by the input one-time password, and a management server configured to manage the in-company gate and the in-company apparatus, wherein the smart badge comprises:

a communication unit capable of performing wireless communication, an OTP (one-time password) storage unit configured to store therein OTP information for generating one-time password (OTP), a display unit configured to display information, an image storage unit configured to store therein at least two images to be displayed on the display unit, a personal information storage unit configured to store therein user's personal information, an input unit that is to be used for selecting an image to be displayed on the display unit, and a control unit configured to control the respective constitutional elements, wherein any one of the images is to be selected by a user's request or is to be automatically selected by the control unit, and wherein when any one of the images is set to be automatically selected by the control unit, the control unit outputs an image, on which the user's personal information is displayed, of the images through the display unit if it is determined through wireless communication with the in-company gate that the user enters a company through the in-company gate, and outputs an image, on which the user's personal information is not displayed, of the images through the display unit if it is determined through wireless communication with the in-company gate that the user goes outside through the in-company gate.

2. The authentication system according to claim 1, wherein the management server is configured to manage an in-company activity hysteresis of the user by using information, which indicates that the smart badge is connected to the in-company gate and the in-company apparatus.

3. A smart badge comprising:

a communication unit capable of performing wireless communication;

an OTP (one-time password) storage unit configured to store therein OTP information for generating one-time password (OTP);

a display unit configured to display information;

an image storage unit configured to store therein at least two images to be displayed on the display unit;

a personal information storage unit configured to store therein user's personal information;

an input unit that is to be used for selecting an image to be displayed on the display unit, and a control unit configured to control the respective constitutional elements, wherein any one of the images is to be selected by a user's request or is to be automatically selected by the control unit, and wherein when any one of the images is set to be automatically selected by the control unit, the control unit outputs an image, on which the user's personal information is displayed, of the images through the display unit if it is determined through wireless communication with an in-company gate that the user enters a company through the in-company gate, and outputs an image, on which the user's personal information is not displayed, of the images through the display unit if it is determined through wireless communication with the in-company gate that the user goes outside through the in-company gate.

4. The smart badge according to claim 3, further comprising a bio-information authentication unit configured to authenticate bio-information of the user, wherein when user authentication is performed through the bio-information authentication unit, the control unit controls the constitutional elements.

5. The smart badge according to claim 3, wherein when a one-time password (OTP) generation request is received through the input unit, the control unit generates one-time password (OTP) by using the OTP information and outputs the generated one-time password (OTP) through the display unit.

* * * * *